United States Patent
Arihara et al.

(10) Patent No.: US 9,300,185 B2
(45) Date of Patent: Mar. 29, 2016

(54) FLYWHEEL POWER GENERATING FACILITY AND METHOD OF OPERATING SAME

(71) Applicant: KABUSHIKI KAISHA TOSHIBA, Minato-ku (JP)

(72) Inventors: Yoshitaka Arihara, Sodegaura (JP); Teruyuki Ishizuki, Tokyo (JP); Takahisa Kageyama, Ichikawa (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 502 days.

(21) Appl. No.: 13/798,565

(22) Filed: Mar. 13, 2013

(65) Prior Publication Data

US 2013/0193788 A1 Aug. 1, 2013

Related U.S. Application Data

(63) Continuation of application No. PCT/JP2012/073631, filed on Sep. 14, 2012.

(30) Foreign Application Priority Data

Oct. 11, 2011 (JP) ................................. 2011-224245

(51) Int. Cl.
*H02K 7/02* (2006.01)
*H02K 7/18* (2006.01)
(Continued)

(52) U.S. Cl.
CPC . *H02K 7/025* (2013.01); *H01J 3/30* (2013.01); *H02K 7/18* (2013.01); *H02P 3/00* (2013.01); *Y02E 60/16* (2013.01)

(58) Field of Classification Search
USPC ..................... 322/4; 310/74; 318/161; 307/82
See application file for complete search history.

(56) References Cited

U.S. PATENT DOCUMENTS

| | | | | |
|---|---|---|---|---|
| 5,256,907 A | * | 10/1993 | Shimada et al. | 307/82 |
| 5,703,423 A | * | 12/1997 | Fukao et al. | 310/90.5 |
| 2011/0049892 A1 | | 3/2011 | Ross | |

FOREIGN PATENT DOCUMENTS

| CA | 2028866 A1 | 5/1992 |
|---|---|---|
| JP | 09-163639 A | 6/1997 |

(Continued)

OTHER PUBLICATIONS

Koda et al. JP 2001-197688 Jul. 2001; English MachineTranslation.*

(Continued)

*Primary Examiner* — Burton Mullins
(74) *Attorney, Agent, or Firm* — Oblon, McClelland, Maier & Neustadt, L.L.P.

(57) ABSTRACT

In one embodiment, a flywheel power generating facility includes a flywheel power generator including a flywheel for storing rotational energy, and configured to convert the rotational energy into electric power to supply the electric power to a test facility. The generating facility further includes a driving motor configured to rotate the flywheel, and a power supply device configured to supply electric power to the driving motor. The generating facility further includes a detector configured to output a signal related to the rotation of the flywheel, and a controller configured to control operation of the driving motor, based on the outputted signal. The controller controls the operation of the driving motor so that the driving motor provides accelerating torque to the flywheel while the supply of the electric power to the test facility is stopped and while the electric power is supplied to the test facility.

8 Claims, 6 Drawing Sheets

(51) Int. Cl.
   *H02J 15/00*   (2006.01)
   *H02P 9/00*    (2006.01)
   *H01J 3/30*    (2006.01)
   *H02P 3/00*    (2006.01)

(56) References Cited

FOREIGN PATENT DOCUMENTS

| | | | |
|---|---|---|---|
| JP | 9-163639 | A | 6/1997 |
| JP | 2001-197688 | A | 7/2001 |
| JP | 2002-345152 | A | 11/2002 |
| JP | 2011-152013 | A | 8/2011 |
| JP | 2011-239553 | A | 11/2011 |

OTHER PUBLICATIONS

Oyama et al. JP 2011-239553 Nov. 2011; English MachineTranslation.*
Mori et al. JP 2002-345152 Nov. 2002; English MachineTranslation.*
Korean Office Action issued Jun. 10, 2014, in Korea Patent Application No. 10-2013-7009310 (with English translation).
Japanese Office Action issued on Dec. 5, 2014 in Patent Application No. 2011-224245 with English translation.
Japanese Office Action issued Feb. 13, 2015 in Patent Application No. 2011-224245 (with English Translation).
English translation of Written Opinion of the International Search Authority issued Jul. 16, 2013, in PCT/JP2012/073631 filed Sep. 14, 2012.
International Search Report issued Nov. 20, 2012, in PCT/JP2012/073631 filed Sep. 14, 2012 with English translation of category of cited documents.
International Search Report issued Nov. 20, 2012 in PCT/JP2012/073631 (Submitting English translation only).
Extended European Search Report issued Mar. 23, 2015 in Patent Application No. 12830877.2
Office Action issued Nov. 19, 2015, in European Patent Application No. 12 830 877.2.

* cited by examiner

FLYWHEEL POWER GENERATING FACILITY AND METHOD OF OPERATING SAME

CROSS REFERENCE TO RELATED APPLICATIONS

This application is a continuation of International Application No. PCT/JP2012/073631, filed on Sep. 14, 2012, which is based upon and claims the benefit of priority from the prior Japanese Patent Application No. 2011-224245, filed on Oct. 11, 2011, the entire contents of which are incorporated herein by reference.

FIELD

Embodiments described herein relate to a flywheel power generating facility and a method of operating the same.

BACKGROUND

FIG. 6 is a schematic view showing a configuration of a conventional flywheel power generating facility.

A flywheel power generator 1 includes a flywheel 1a for storing rotational energy (mechanical energy), and can convert the stored rotational energy into electric energy (electric power) to output the electric energy. For example, the flywheel power generator 1 is used to supply the electric power to a nuclear fusion test facility 6 which needs large current in a short period of time. In FIG. 6, the flywheel power generator 1 is directly connected to a driving motor 2, and the driving motor 2 is further connected to a power supply device 3. The driving motor 2 rotates the flywheel 1a, and the power supply device 3 supplies electric power to the driving motor 2.

When the flywheel power generator 1 is used as a power source of the nuclear fusion test facility 6, the flywheel power generating facility accelerates the flywheel power generator 1 by the driving motor 2 to store the rotational energy in the flywheel 1a before starting the operation of the nuclear fusion test facility 6. In this case, a detector 5 (e.g., a rotational speed detector) and a controller 4 (e.g., a rotational speed controller) are used in the flywheel power generating facility to realize stable acceleration control. For example, the detector 5 detects a rotational speed of the flywheel 1a, and the controller 4 controls the operation of the driving motor 2 based on the detected rotational speed.

While the nuclear fusion test facility 6 operates, the flywheel power generator 1 converts the stored rotational energy into the electric energy to supply the electric energy to the nuclear fusion test facility 6. As a consequence, the rotational speed of the flywheel 1a declines with reduction in rotational energy. In the flywheel power generating facility, the operation of the nuclear fusion test facility 6 is stopped when the rotational speed declines to a preset speed, and then the flywheel power generator 1 is accelerated again by the driving motor 2. In the flywheel power generating facility, the acceleration of the flywheel power generator 1 and the supply of the electric power to the nuclear fusion test facility 6 are repeated so as to operate the nuclear fusion test facility 6 repeatedly.

When the flywheel power generating facility starts up or the rotational speed of the flywheel 1a is lowered, the controller 4 controls the operation of the driving motor 2 to increase the rotational speed of the flywheel 1a up to a rated rotational speed.

DETAILED DESCRIPTION

Figure 1:
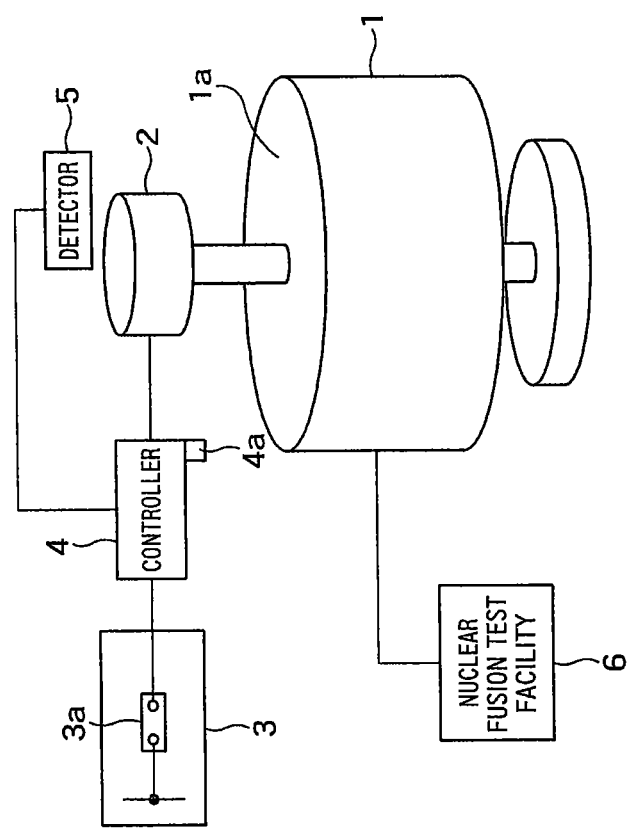
FIG. 1 is a schematic view showing a configuration of a flywheel power generating facility of a first embodiment.

Embodiments will now be explained with reference to the accompanying drawings.

In the conventional flywheel power generating facility, a wound rotor induction motor is employed as the driving motor 2, and a speed controller using a liquid resistor provided to a secondary coil is employed as the controller 4. In the conventional flywheel power generating facility, while the electric power is supplied to the nuclear fusion test facility 6, a power supply circuit breaker 3a in the power supply device 3 is opened so as to stop the supply of the electric power from the power supply device 3 to the driving motor 2.

The first reason thereof is that the nuclear fusion test facility 6 needs to be configured as a system completely independent of the power system of an electric power company since the nuclear fusion test facility 6 uses large electric power that changes abruptly. The second reason thereof is that the conventional flywheel power generating facility uses a water rheostat for acceleration control, so that it is not appropriate to use the flywheel power generator 1 during rapid change in rotational speed during the operation of the nuclear fusion test facility 6.

Therefore, the conventional flywheel power generator 1 needed to have a power generation capacity and a flywheel size that enable the conventional flywheel power generator 1 to store the maximum energy required from the nuclear fusion test facility 6. However, since operation time of the conventional nuclear fusion test facility 6 was as short as about 10 seconds at the maximum, it was possible to realize such a flywheel power generator 1 that can store the maximum amount of energy required by the nuclear fusion test facility 6.

However, in recent nuclear fusion tests, long-time plasma operation as long as 5 minutes or more are being planned to be carried out. In the long-time operation of the nuclear fusion test facility 6, the operating time during plasma ignition that needs large active power is short, whereas the operating time during a subsequent plasma maintenance period is long. Therefore, rotational energy loss (i.e., rotational speed decline) due to the energy loss of the flywheel power generating facility during operation is large.

Accordingly, if it is attempted to satisfy the operating time required from the nuclear fusion test facility 6, the amount of necessary rotational energy is drastically increased. In order to fulfill this requirement with the conventional system configuration, it is necessary to make considerable increase in flywheel effect of the flywheel power generator 1. However, this necessitates the flywheel power generator 1 made far larger in size and weight than the conventional flywheel power generator, which may not only bring disadvantages to the generator 1 in terms of economical efficiency and delivery deadline but may also disable the generator 1 from being embodied.

In one embodiment, a flywheel power generating facility includes a flywheel power generator including a flywheel for storing rotational energy, and configured to convert the rotational energy into electric power to supply the electric power to a test facility. The generating facility further includes a driving motor configured to rotate the flywheel, and a power supply device configured to supply electric power to the driving motor. The generating facility further includes a detector configured to output a signal related to the rotation of the flywheel, and a controller configured to control operation of the driving motor, based on the outputted signal. The controller controls the operation of the driving motor so that the driving motor provides accelerating torque to the flywheel while the supply of the electric power to the test facility is stopped and while the electric power is supplied to the test facility.

First Embodiment

Figure 6:
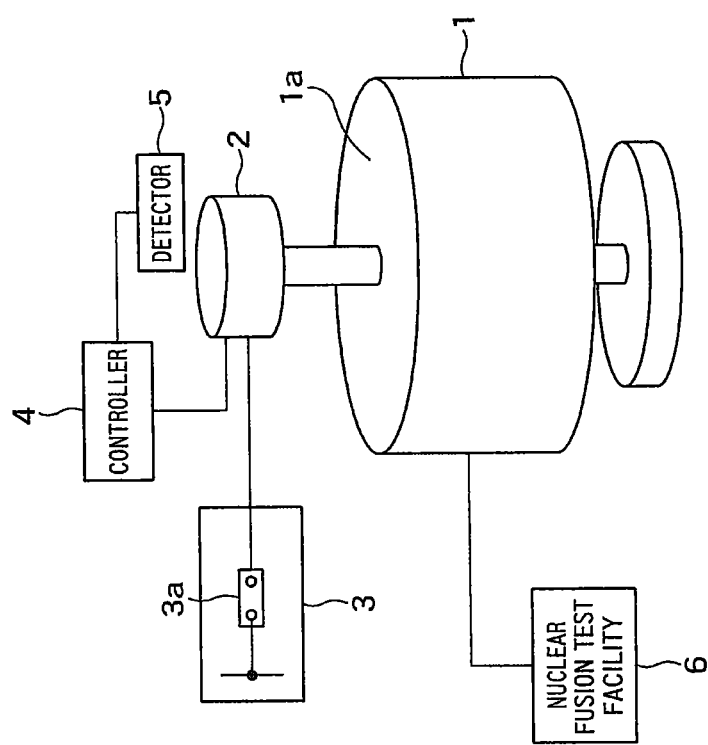
FIG. 6 is a schematic view showing a configuration of a conventional flywheel power generating facility.

FIG. 1 is a schematic view showing a configuration of a flywheel power generating facility of a first embodiment. The configuration of FIG. 1 will be explained by highlighting the differences from the configuration of FIG. 6.

In FIG. 1, the flywheel power generator 1 is directly connected to the driving motor 2, and the driving motor 2 is a squirrel-cage induction motor. The power supply device 3 supplies AC power of a commercial frequency. The power delivery from the power supply device 3 to the driving motor 2 is conducted via the controller 4 including a variable voltage variable frequency converter (VVVF).

The detector 5 detects the rotational speed of the flywheel 1a, and the controller 4 controls the operation of the driving motor 2 based on the detected rotational speed. The controller 4 includes a speed setting module 4a configured to set a setting value of the rotational speed of the flywheel 1a. The controller 4 controls the operation of the driving motor 2 by the VVVF so that the rotational speed of the flywheel 1a detected by the detector 5 becomes equal to the above-stated setting value. In this way, the speed of the flywheel 1a is controlled.

In the present embodiment, the power supply circuit breaker 3a is closed not only before starting and while stopping a plasma test by the nuclear fusion test facility 6, but also while the plasma test is in operation. In other words, the power delivery from the power supply device 3 in the present embodiment is performed not only while the supply of the electric power to the nuclear fusion test facility 6 is stopped but also while the electric power is supplied to the nuclear fusion test facility 6.

Furthermore, the controller 4 continues operation not only while the supply of the electric power to the nuclear fusion test facility 6 is stopped, but also while the electric power is supplied to the nuclear fusion test facility 6 to continue the power delivery from the power supply device 3 to the driving motor 2. Therefore, in the present embodiment, application of accelerating torque from the driving motor 2 to the flywheel 1a is continued even while the electric power is supplied to the nuclear fusion test facility 6.

In this way, the controller 4 of the present embodiment controls the operation of the driving motor 2 so that the driving motor 2 provides the accelerating torque to the flywheel 1a while the supply of the electric power to the nuclear fusion test facility 6 is stopped and while the electric power is supplied to the nuclear fusion test facility 6.

(1) Functions of Flywheel Power Generating Facility of First Embodiment

Functions of the flywheel power generating facility of the first embodiment will be described with reference to FIG. 1 continuously.

In FIG. 1, when the plasma test is started and the electric power is supplied from the flywheel power generator 1 to the nuclear fusion test facility 6, the rotational speed of the flywheel 1a declines. Accordingly, the controller 4 supplies the electric power to the driving motor 2 during the plasma test so as to accelerate the flywheel 1a.

Generally, output power of the driving motor 2 is about several percents of the output power of the flywheel power generator 1. Therefore, in an initial several-second period during plasma ignition that requires large electric power (see FIG. 2), power generation by the flywheel power generator 1 is generally performed by using the rotational energy stored in the flywheel is as an energy source. Therefore, during the plasma ignition, the rotational speed of the flywheel 1a rapidly declines.

Figure 2:
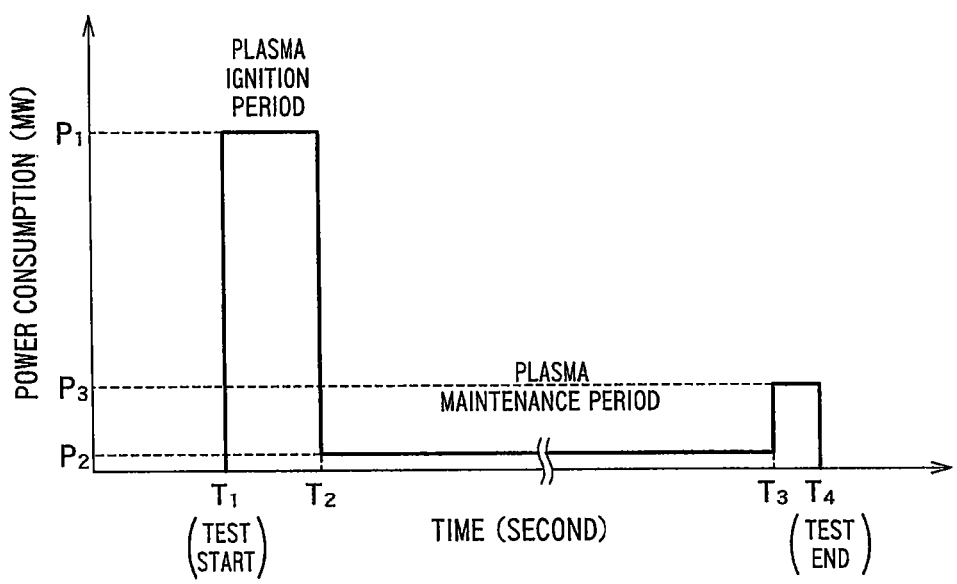
FIG. 2 is a graph showing operation of the flywheel power generating facility of the first embodiment.

FIG. 2 is a graph showing operation of the flywheel power generating facility of the first embodiment. FIG. 2 shows that large electric power "$P_1$" is supplied to the nuclear fusion test facility 6 during a plasma ignition period from "$T_1$" to "$T_2$".

In the present embodiment, the VVVF is therefore used in the controller 4. Accordingly, even when the rotational speed of the flywheel 1a rapidly changes in the present embodiment, electric power can stably be supplied to the driving motor 2 by controlling an effective voltage and a frequency of AC power supplied to the driving motor 2 at a high speed by the VVVF.

On the contrary, a plasma maintenance period from "$T_2$" to "$T_3$" (see FIG. 2) is as long as several hundred seconds, and therefore the amount of energy required from the nuclear fusion test facility 6 is large. However, the necessary electric power "$P_2$" is small as shown in FIG. 2.

Therefore, even in consideration of the total loss including windage loss and bearing loss of the flywheel power generator 1, it is still sufficiently possible to supply electric power of this level to the driving motor 2. Accordingly, it becomes possible in the present embodiment to maintain or increase the rotational speed of the flywheel 1a during the plasma maintenance period from "$T_2$" to "$T_3$". Therefore, the controller 4 of the present embodiment increases the rotational speed of the flywheel 1a up to the setting value during the plasma maintenance period from "$T_2$" to "$T_3$", and once the rotational speed reaches the setting value, the controller 4 maintains this rotational speed of the flywheel 1a.

In this way, the supply of the electric power from the driving motor 2 to the flywheel power generator 1 is performed concurrently with the supply of the electric power from the flywheel power generator 1 to the nuclear fusion test facility 6 during the nuclear fusion test period from "$T_1$" to "$T_4$" in the present embodiment. In this case, if the former electric power is smaller than the latter electric power, energy storage into the flywheel power generator 1 is also executed at the same time.

(2) Effects of First Embodiment

Effects of the first embodiment will be described.

As described above, the power delivery from the power supply device 3 to the driving motor 2 is continued not only while the supply of the electric power to the nuclear fusion test facility 6 is stopped but also while the electric power is supplied to the nuclear fusion test facility 6 in the present embodiment. Therefore, the application of the accelerating torque from the driving motor 2 to the flywheel 1a is continued even while the electric power is supplied to the nuclear fusion test facility 6 in the present embodiment. As a consequence, the following effects can be obtained in the present embodiment.

In the present embodiment, it becomes possible to limit the energy amount stored in the flywheel 1a to the level necessary for the plasma ignition by supplying the energy to be consumed during the plasma maintenance period from the driving motor 2.

Accordingly, when the nuclear fusion test facility 6 is to be constructed, it becomes possible to construct the nuclear fusion test facility 6 that operates long time with a far smaller-size flywheel power generator 1, compared with the conventional case where the energy to be consumed during the plasma maintenance period is also stored in the flywheel 1a as the rotational energy. Employing the small-size flywheel power generator 1 makes it possible to achieve a shorter assembly period on site, reduced construction costs, and reduced building and facility costs.

In the present embodiment, the VVVF supporting the driving motor 2 may additionally be provided while the existing flywheel power generator 1 is used. This makes it possible to realize operation tests for maintaining plasma for long time in the nuclear fusion test facility 6 such as JT60. This brings about large economic effects and contribution to the development of a fusion technology.

In this way, according to the present embodiment, it becomes possible to realize long-time operation of the nuclear fusion test facility 6 while suppressing increase in the amount of rotational energy that can be stored in the flywheel power generator 1.

The flywheel power generating facility of the present embodiment may be applied to test facilities other than the nuclear fusion test facility 6. Examples of such test facilities include particle accelerators.

The detector 5 of the present embodiment may output a signal that holds information other than the rotational speed as the signal related to the rotation of the flywheel 1a, and the controller 4 of the present embodiment may control the operation of the driving motor 2 based on this outputted signal. For example, the signal may hold rotational acceleration of the flywheel 1a.

Second Embodiment

Figure 3:
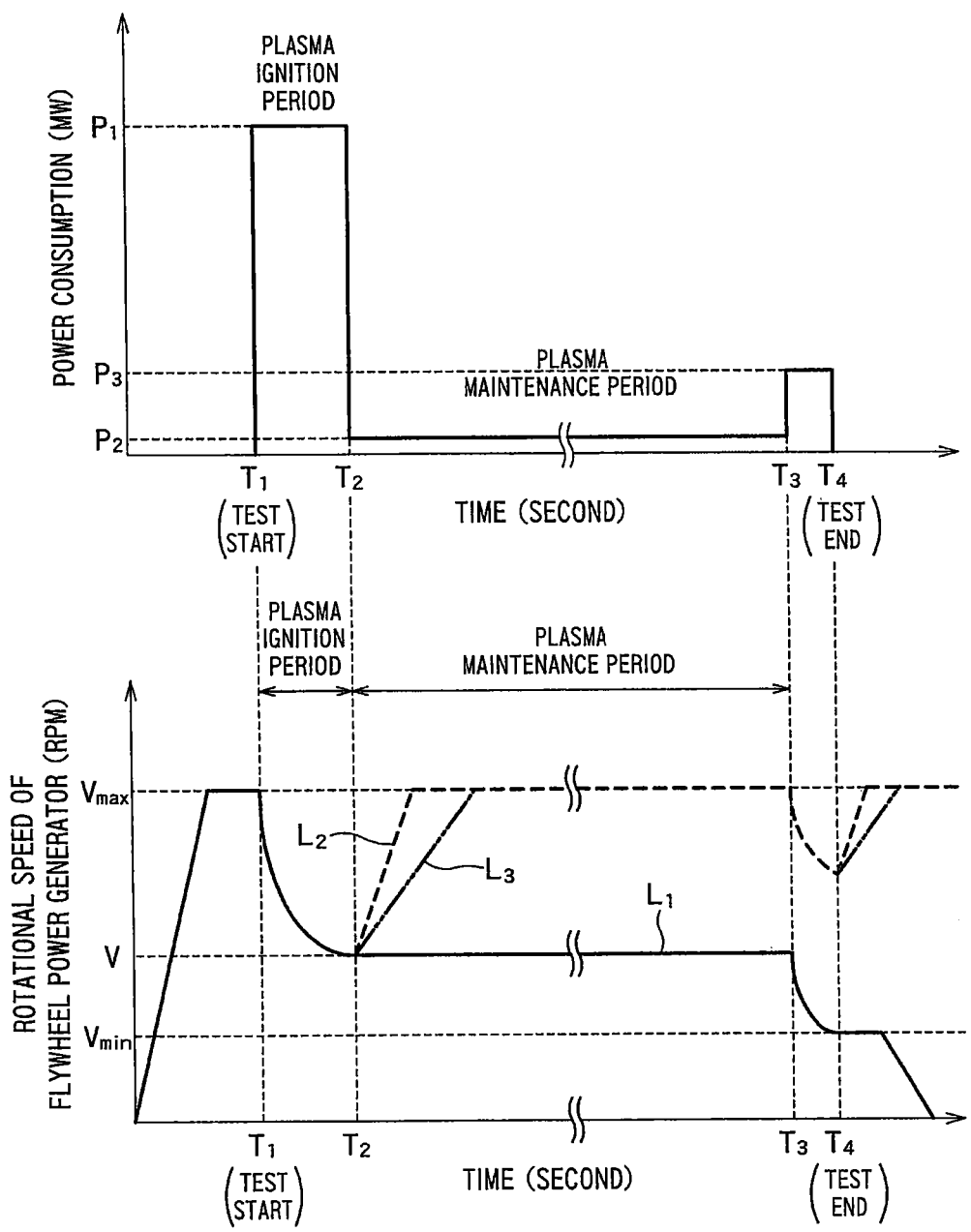
FIG. 3 is a graph showing operation of a flywheel power generating facility of a second embodiment.

FIG. 3 is a graph showing operation of a flywheel power generating facility of a second embodiment.

In the present embodiment, the setting value of the speed setting module 4a while the electric power is supplied to the nuclear fusion test facility 6 is set to an upper limit in an operating speed range of the flywheel power generator 1 in FIG. 1. In FIG. 3, a lower limit and the upper limit in the operating speed range of the flywheel power generator 1 are denoted by "Vmin" and "Vmax", respectively.

A curved line $L_1$ in FIG. 3 represents a change in the rotational speed of the flywheel power generator 1 (flywheel 1a) of the first embodiment. In the first embodiment, the setting value of the speed setting module 4a while the electric power is supplied to the nuclear fusion test facility 6 is set to a speed "V" between "Vmin" and "Vmax". Consequently, the rotational speed of the flywheel power generator 1 is maintained at the speed "V" while the electric power Is supplied to the nuclear fusion test facility 6. When the rotational speed is changed from the speed "V", the controller 4 controls the operation of the driving motor 2 to change back the rotational velocities to the speed "V".

A curved line $L_2$ represents a change in the rotational speed of the flywheel power generator 1 of the second embodiment. In the second embodiment, the setting value of the speed setting module 4a while the electric power is supplied to the nuclear fusion test facility 6 is set to "Vmax". Consequently, while the electric power is supplied to the nuclear fusion test facility 6, the controller 6 controls the operation of the driving motor 2 to maintain the rotational speed of the flywheel power generator 1 at "Vmax".

A curved line $L_3$ represents a change in the rotational speed of the flywheel power generator 1 of a third embodiment. The curved line $L_3$ will be described in the third embodiment.

(1) Functions of Flywheel Power Generating Facility of Second Embodiment

Functions of the flywheel power generating facility of the second embodiment will be described with reference to FIG. 3 continuously.

In the present embodiment, the setting value of the speed setting module 4a is set to "Vmax", so that the flywheel power generator 1 is accelerated with the electric power equal to a difference between the electric power required for maintaining plasma and the maximum output electric power of the driving motor 2. As a result, the rotational speed of the flywheel power generator 1 which was slowed down during the plasma ignition is recovered up to "Vmax", and the maximum storable energy is stored in the flywheel power generator 1.

Immediately after the start of the plasma maintenance period, the controller 4 controls the operation of the driving motor 2 so that the rotational speed of the flywheel power generator 1 returns to the upper limit "Vmax", thereby accelerating the rotational speed up to "Vmax".

The present embodiment is also effective in the case where, for example, the nuclear fusion test facility 6 has a power consumption peak even during the plasma maintenance period. This is because a large volume of electric power is needed during such peak time, and the maximum storable energy is stored in the flywheel power generator 1 of the present embodiment prior to such peak time.

(2) Effects of Second Embodiment

Effects of the second embodiment will be described.

As described above, the setting value of the speed setting module 4a while the electric power is supplied to the nuclear fusion test facility 6 is set to the upper limit "Vmax" in the operating speed range of the flywheel power generator 1 in the present embodiment.

Consequently, according to the present embodiment, the flywheel power generating facility can demonstrate maximum capacity while the electric power is supplied to the nuclear fusion test facility 6. As a result, it becomes possible to enhance a degree of freedom in execution of the operation tests for maintaining plasma for long time in the nuclear fusion test facility 6

Third Embodiment

Figure 4:
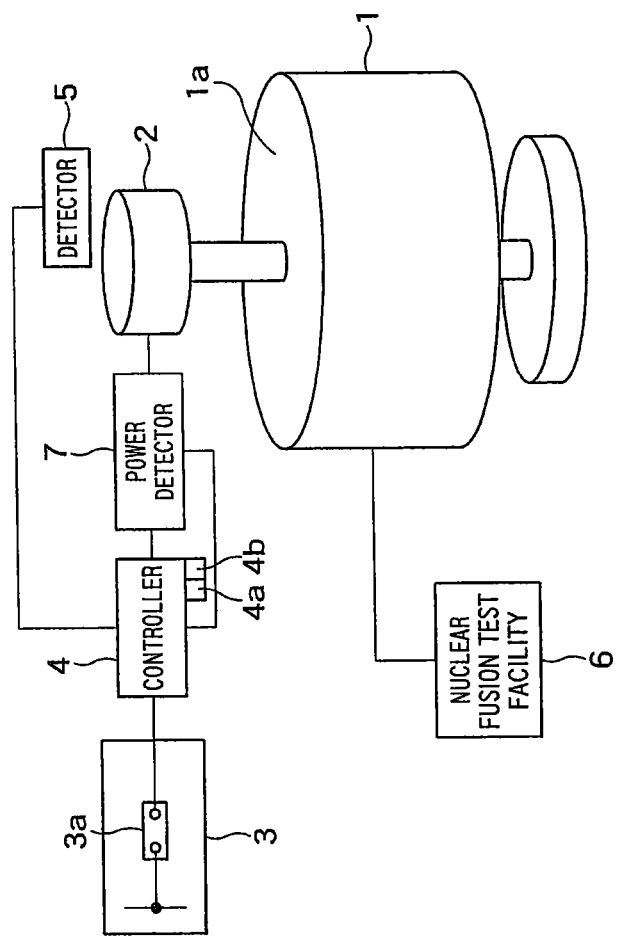
FIG. 4 is a schematic view showing a configuration of a flywheel power generating facility of a third embodiment.

FIG. 4 is a schematic view showing a configuration of a flywheel power generating facility of a third embodiment.

In addition to the configuration of FIG. 1, the flywheel power generating facility in FIG. 4 includes a power detector 7. The power detector 7 monitors the electric power supplied from the power supply device 3 to the driving motor 2 via the controller 4.

The controller 4 also includes an upper limit setting module 4b configured to set an upper limit of the electric power supplied to the driving motor 2. The controller 4 controls the operation of the driving motor 2 so that a power value detected by the power detector 7 does not exceed the upper limit set in the upper limit setting module 4b.

(1) Functions of Flywheel Power Generating Facility of Third Embodiment

Functions of the flywheel power generating facility of the third embodiment will be described with reference to FIG. 4 continuously.

As described in the first embodiment, the nuclear fusion test facility 6 needs large electric power during the plasma ignition period immediately after the start of operation, so that the rotational speed of the flywheel power generator 1 rapidly declines. In this case, if the setting value of the rotational speed is set to the upper limit in the operational speed range as in the second embodiment, the difference between the electric power required for maintaining plasma and the output power of the driving motor 2 may rapidly increase, and the driving motor 2 may be operated with overpower.

Accordingly, in the present embodiment, the electric power supplied from the controller 4 to the driving motor 2 is monitored by the power detector 7. The controller 4 limits the electric power supplied to the driving motor 2 to the upper limit set in the upper limit setting module 4b so that the electric power, which is supplied to the driving motor 2 while the electric power is supplied to the nuclear fusion test facility 6, does not exceed a rated value.

As a result, as shown with the curved line $L_3$ in FIG. 3, duration of time taken for the operational speed to reach the upper limit "Vmax" in the operational speed range becomes longer than that of the second embodiment. However, according to the present embodiment, it becomes possible to prevent the overpower operation of the driving motor 2 and to realize stable operation of the driving motor 2 and the controller 4.

(2) Effects of Third Embodiment

Effects of the third embodiment will be described.

As described above, the controller 4 of the present embodiment includes the upper limit setting module 4b configured to set the upper limit of the electric power supplied to the driving motor 2. Furthermore, the controller 4 controls the operation of the driving motor 2 so that the electric power supplied to the driving motor 2 does not exceed the upper limit.

Consequently, according to the present embodiment, it becomes possible to realize stable operation within the capacity of the flywheel power generating facility and to achieve stable operation in the operation tests for maintaining plasma for long time in the nuclear fusion test facility 6.

Fourth Embodiment

Figure 5:
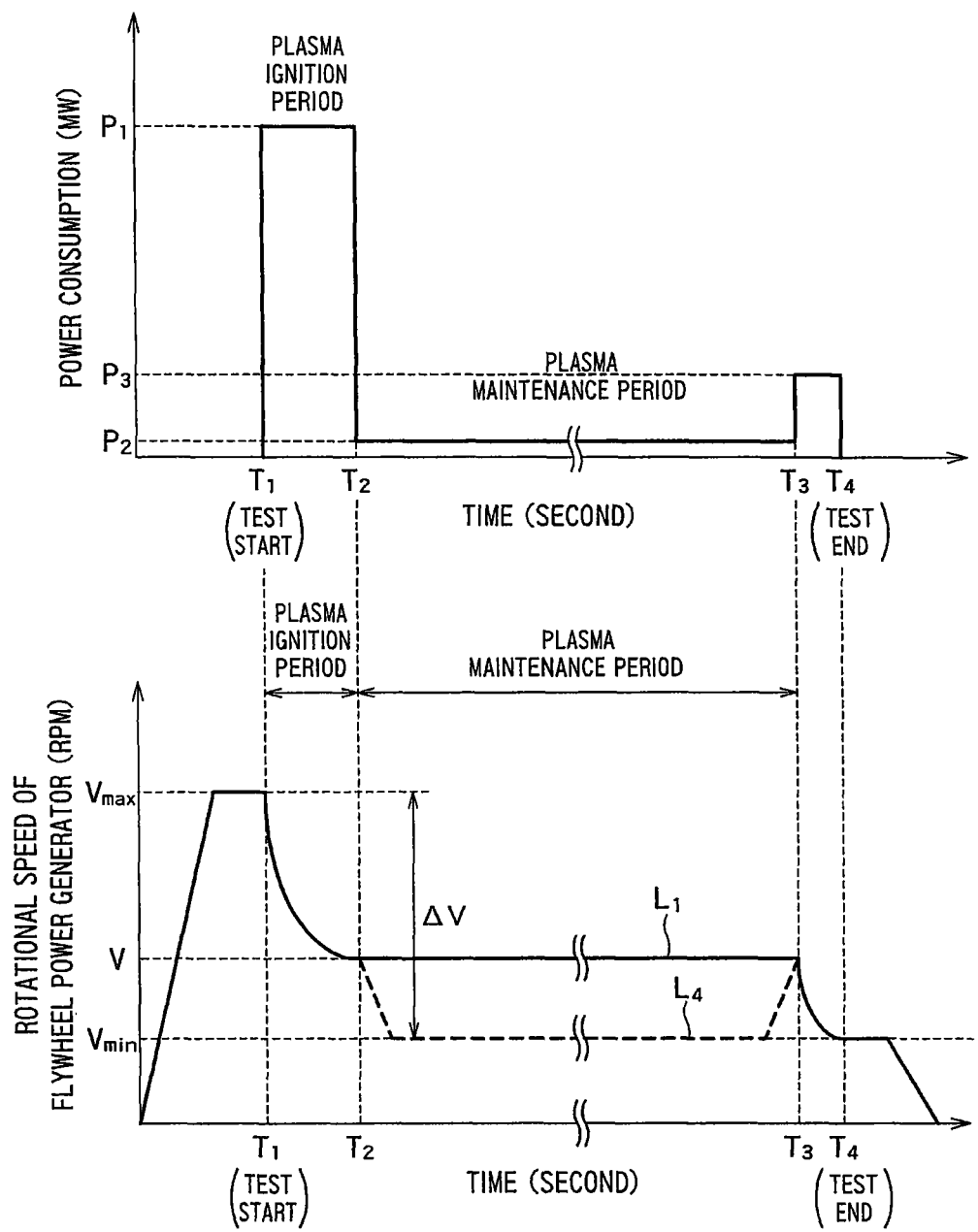
FIG. 5 is a graph showing operation of a flywheel power generating facility of a fourth embodiment.

FIG. 5 is a graph showing operation of a flywheel power generating facility of a fourth embodiment.

The setting value "V" in the speed setting module 4a of the first embodiment and the setting value "Vmax" in the speed setting module 4a of the second embodiment are fixed value.

On the contrary, the controller 4 of the fourth embodiment includes the speed setting module 4a that can set a setting value that varies every moment during the electric power is supplied to the nuclear fusion test facility 6. More specifically, in the fourth embodiment, the setting value of the speed setting module 4a can be varied with time. Hereinafter, the setting value (speed instruction value) of the speed setting module 4a that varies with time is referred to as a speed pattern.

(1) Functions of Flywheel Power Generating Facility of Fourth Embodiment

Functions of the flywheel power generating facility of the fourth embodiment will be described with reference to FIG. 5 continuously.

The controller 4 of the present embodiment calculates stored energy (rotational energy) required from the flywheel power generator 1 at each moment during the test operation of the nuclear fusion test facility 6, based on a required power pattern (output power pattern for the flywheel power generator 1) during the test operation.

The controller 4 sets setting values (speed patterns) that vary every moment by using graphs, tables, functions or the like so that the minimum rotational speed required for attaining the stored energy is obtained. As a consequence, it becomes possible to operate the flywheel power generator 1 at the minimum rotational speed that can achieve the required power pattern of the nuclear fusion test facility 6.

An example of the rotational speed of the flywheel power generator 1 controlled with such setting values is shown as a curved line $L_4$ in FIG. 5. The controller 4 of the present embodiment adjusts the rotational speed of the flywheel power generator 1 within a rotational speed variation width "ΔV" in order to provide a necessary amount of stored energy to the flywheel power generator 1 and to achieve the minimum rotational speed required for maintaining the stored energy. The rotational speed variation width "ΔV" is a speed width from "Vmax" to "Vmin".

In FIG. 5, the line $L_4$ is drawn as a straight line parallel to an axis "T" except immediately after $T_2$ and immediately before $T_3$. However, the line $L_4$ is a curve line in actuality in many cases.

(2) Effects of Fourth Embodiment

Effects of the fourth embodiment will be described.

As described above, the controller 4 of the present embodiment includes the speed setting module 4a that can set the setting value that varies with time.

Consequently, for example, the minimum rotational speed required for attaining the test pattern can be traced by controlling the rotational speed of the flywheel power generator 1 during the test operation of the nuclear fusion test facility 6 in the way disclosed above in the present embodiment.

Mechanical loss such as windage loss and bearing loss during the operation of the flywheel power generator 1 can be decreased with a lower rotational speed. Therefore, according to the present embodiment, it becomes possible to minimize the loss during operation and to minimize the electric energy required for the test operation of the nuclear fusion test facility 6. This brings about such advantages that electricity bills concerning the test operation of the nuclear fusion test facility 6 can be minimized, for example.

While certain embodiments have been described, these embodiments have been presented by way of example only, and are not intended to limit the scope of the inventions. Indeed, the novel facilities and methods described herein may be embodied in a variety of other forms; furthermore, various omissions, substitutions and changes in the form of the facilities and methods described herein may be made without departing from the spirit of the inventions. The accompanying claims and their equivalents are intended to cover such forms or modifications as would fall within the scope and spirit of the inventions.

The invention claimed is:

1. A flywheel power generating facility comprising:
a flywheel power generator including a flywheel for storing rotational energy, and configured to convert the rotational energy into electric power to supply the electric power to a test facility that is configured to perform a nuclear fusion test;
a driving motor configured to rotate the flywheel;
a power supply device configured to supply electric power to the driving motor;
a detector configured to detect a rotational speed of the flywheel; and
a controller configured to control operation of the driving motor, based on the rotational speed detected by the detector,
wherein
the controller is configured to control the operation of the driving motor so that the driving motor provides accelerating torque to the flywheel while the supply of the electric power to the test facility is stopped and while the electric power is supplied to the test facility,
the flywheel power generator is configured to supply first electric power to the test facility during a first period and to supply second electric power smaller than the first electric power to the test facility during a second period, which is after the first period and longer than the first period, while the electric power is supplied to the test facility,
the controller includes a speed setting module configured to set a setting value of the rotational speed, and
the controller is configured to control the operation of the driving motor so that
the rotational speed is reduced, during the first period, from a first speed to a second speed lower than the first speed, and
the rotational speed becomes, during the second period, the setting value, which is equal to or lower than the first speed.

2. The generating facility of claim 1, wherein
the controller controls the operation of the driving motor so that the rotational speed becomes, during the second period, the setting value, which is equal to or lower than the first speed and equal to or larger than the second speed.

3. The generating facility of claim 1, wherein
the first speed is an upper limit of the rotational speed.

4. The generating facility of claim 1, wherein the setting value of the rotational speed is an upper limit of the rotational speed.

5. The generating facility of claim 1, wherein the speed setting module sets the setting value that varies with time.

6. The generating facility of claim 5, wherein the speed setting module sets the setting value to a minimum speed that enables the test facility to operate.

7. The generating facility of claim 1, wherein
the controller comprises an upper limit setting module configured to set an upper limit of the electric power supplied to the driving motor, and
the controller controls the operation of the driving motor so that the electric power supplied to the driving motor does not exceed the upper limit.

8. A method of operating a flywheel power generating facility, comprising:
controlling, by a controller, operation of a driving motor for rotating a flywheel of a flywheel power generator so that the driving motor provides accelerating torque to the flywheel while supply of electric power from the flywheel power generator to a test facility is stopped and while the electric power is supplied from the flywheel power generator to the test facility, the controller including a speed setting module configured to set a setting value of the rotational speed, and the test facility being configured to perform a nuclear fusion test;
supplying first electric power from the flywheel power generator to the test facility during a first period and supplying second electric power smaller than the first electric power from the flywheel power generator to the test facility during a second period, which is after the first period and longer than the first period, while the electric power is supplied to the test facility; and
controlling, by the controller, the operation of the driving motor so that
the rotational speed is reduced, during the first period, from a first speed to a second speed lower than the first speed, and
the rotational speed becomes, during the second period, the setting value, which is equal to or lower than the first speed.

* * * * *